Figure 1:
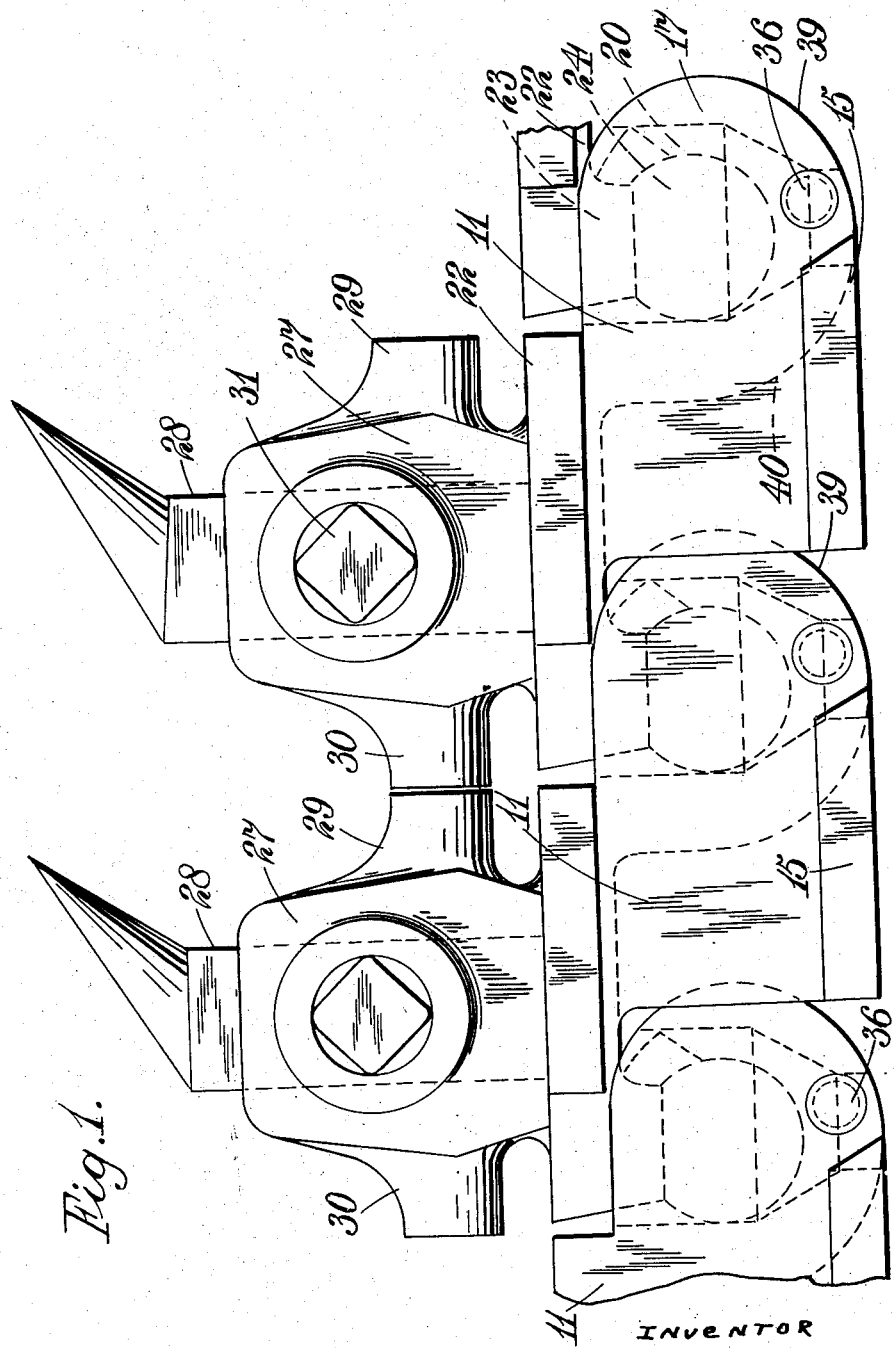

Sept. 4, 1951

S. E. PROCTOR 2,566,675

COAL CUTTER CHAIN

Filed Oct. 13, 1947

3 Sheets-Sheet 1

INVENTOR
S. E. Proctor
By Watson, Cole, Grindle, & Watson

Sept. 4, 1951 S. E. PROCTOR 2,566,675
COAL CUTTER CHAIN
Filed Oct. 13, 1947 3 Sheets-Sheet 2
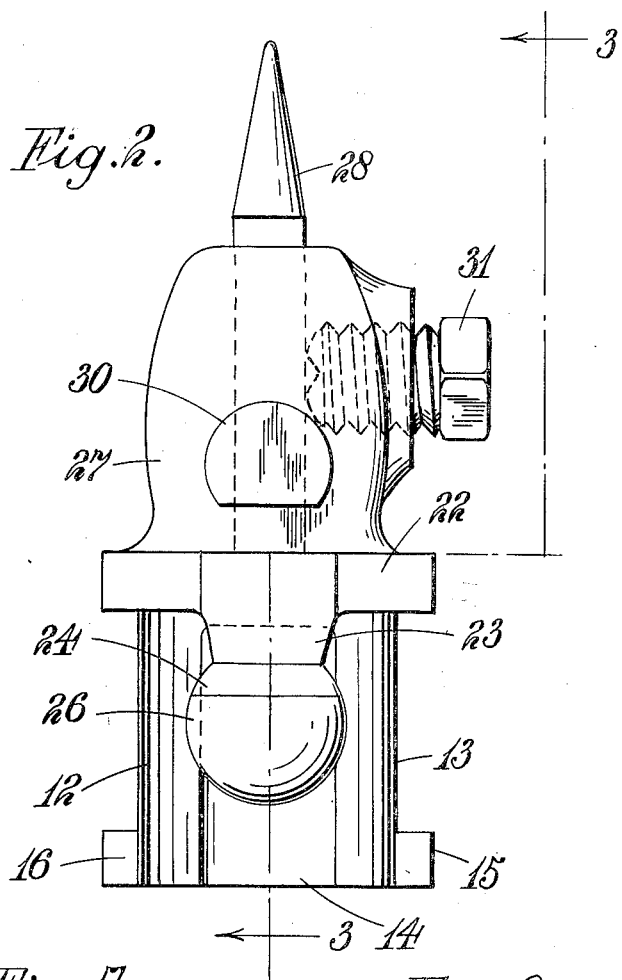
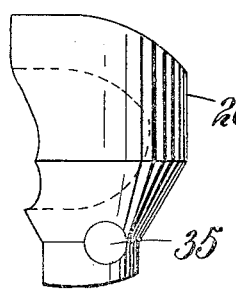
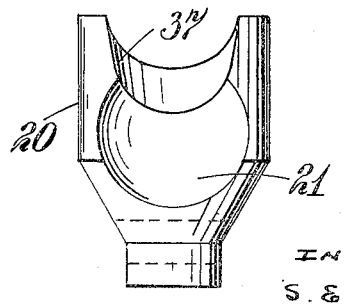
INVENTOR
S. E. Proctor
By Watson, Cole, Grindle & Watson

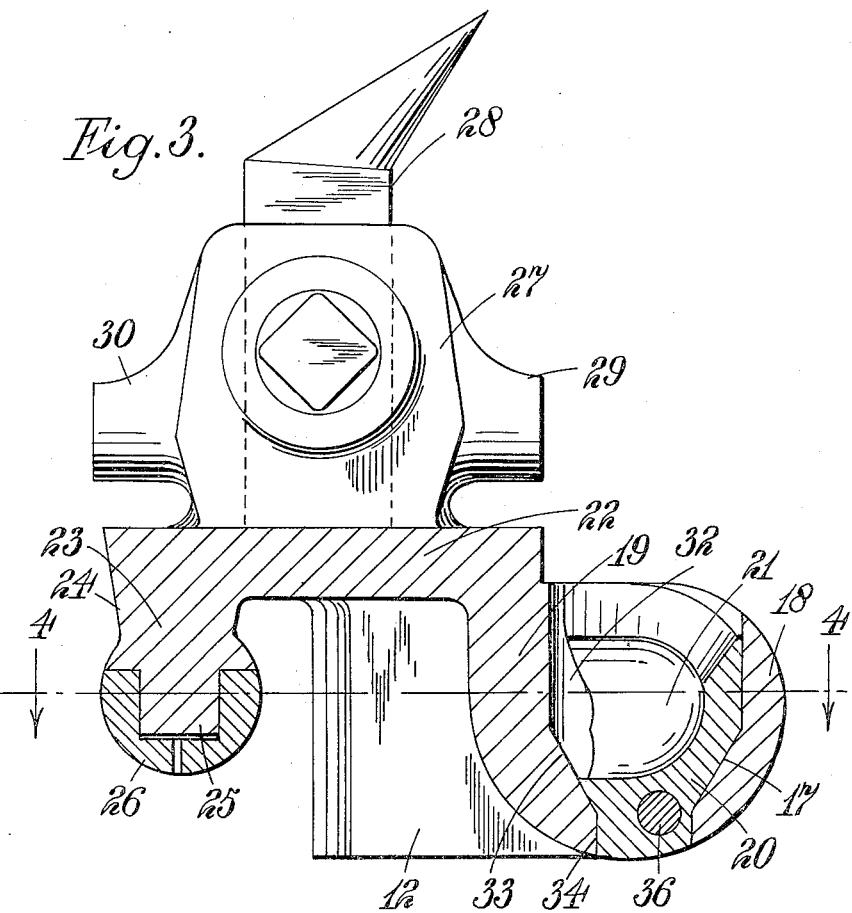
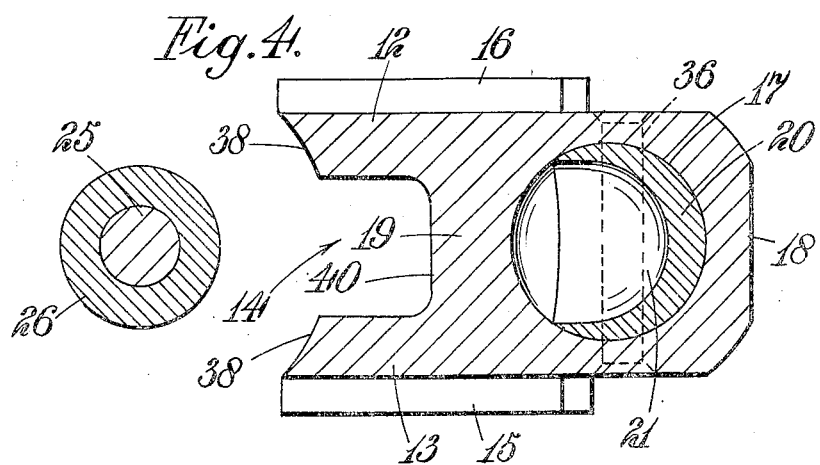

Patented Sept. 4, 1951

2,566,675

UNITED STATES PATENT OFFICE 2,566,675

COAL CUTTER CHAIN

Sidney Ernest Proctor, Aylesbury, England, assignor to Austin Hoy & Company Limited, Aylesbury, England, a British company Application October 13, 1947, Serial No. 779,587
In Great Britain October 14, 1946

5 Claims. (Cl. 262—33)

This invention comprises improvements in or relating to coal cutter chains.

It is an object of the invention to provide a chain suitable for carrying picks in a coal cutter chain which is capable of bending in two dimensions. Ordinarily a coal cutter chain works round a flat jib and cuts a horizontal slot beneath the coal in the seam which is being worked, by means of picks which are carried on the links of the chain and project outwardly therefrom more or less in the plane of the jib. If a chain can be produced which will bend not only in the plane of the jib so as to pass around the sprockets carried in this plane but also in a plane at right-angles thereto, the end of the jib can be bent upwardly so as to carry the chain up into the coal at the back of the slot and so not only free the coal beneath the seam but also detach it from the body of coal behind it and make its recovery more rapid and easier. The problem is to devise a cutter chain which will fulfill these conditions and at the same time be able to stand up to the hard wear required of coal cutter chains.

Hitherto coal cutter chains have been constructed of links which are connected with one another by pin joints and are therefore capable of hinging or bending only in one plane.

According to the present invention the links of a coal cutter chain are connected together by ball and socket joints, the ball members having necks projecting from them which act as the connecting elements to the next link of chain.

Preferably each link is provided with a socket at one end and a neck carrying a ball at the other end, the said ball being adapted to be received in the socket of the adjoining link. The neck portions preferably extend from the ball members in a direction away from the base of the chain and towards the picks carried thereby, and the sockets which fit the ball members each have a wall which extends between the ball member in the socket and the next link of the chain. This wall, so located, affords a surface which takes the pull of the chain directly and so assures more effective resistance to wear.

The following is a description, by way of example, of one construction in accordance with the invention, reference being made to the accompanying drawings in which—

Figure 1 is a side elevation of several links of a chain in accordance with the invention, Figure 2 is an end elevation of one link, Figure 3 is a side elevation partly in section upon the line 3—3 of Figure 2, looking in the direction of the arrows, Figure 4 is a section upon the line 4—4 of Figure 3 looking in the direction of the arrows, Figure 5 is a side elevation and Figure 6 is an end elevation of a liner for the socket.

Each link 11 of the chain consists of a forging or casting having two flat sides 12, 13, which afford a considerable thickness of metal and are spaced apart from each other by an opening 14. Along one edge, which may be referred to as the inner or bottom edge, there are flanges or gibs 15, 16, to run in the usual grooves in the jib of the coal cutter. Between the side walls 12, 13, there is formed towards one end a socket 17, by means of connecting walls 18, 19, integral with the side walls and extending across the space between them. Within the socket is a liner 20 containing a hemispherical recess 21. The liner is hereinafter more fully described.

The side walls 12, 13, are united at the top by a horizontal wall or platform 22 which overlies the space 14 and is extended beyond the side walls to the end of the link where it carries a downwardly-depending neck 23 to hold a ball member 24. The ball member 24 is formed in two parts, the main part being integral with the neck 23 and carrying a dowel 25 on which is fitted a removable part 26 of the ball member, which is machined spherical on its external surface. In the event of wear the portion 26 can be removed and replaced with a fresh member. The platform 22 carries a pick-box 27 which may either be formed integral with the link or welded on to the platform. The pick-box is located partly on the part of the platform 22 which directly unites the side walls 12, 13, and partly on the projecting part of the platform 22 which carries the neck 23 of the ball member 24. It contains a recess for a pick 28 and has stops 29, 30, which are of such length that when the chain is running in a straight line the stops on the pick-boxes run almost in contact with one another and prevent reverse bending of the chain. Each pick-box is provided with a setscrew 31 to hold the pick 28.

The centre of the ball 24 is in line with the centre of curvature of the hemispherical recess 21 in the socket-liner 20 at the other end of the link, and the ball 24 is spaced sufficiently from the ends of the side walls 12, 13 of the link to permit the socket end of another link to be engaged with the ball as shown in Figure 1.

The liner 20 of the socket is located in a bore 32 which extends inwardly, i. e. toward the base of the link, has parallel walls in its upper portion and is then tapered as shown at 33 to a smaller diameter at 34 where it passes through the bottom of the socket. The liner itself is correspondingly shaped, as seen in Figures 5 and 6, and is pierced with a transverse hole 35 at its smaller end below the hemispherical recess 21 to receive a rivet 36 by which it is held in place in the recess. A slot 37 is cut in the upper portion of the liner 20 to accommodate the neck 23 and to permit hinging movements of one link of the chain relatively to the next so as to enable it to pass around the driving sprockets provided in the coal cutter for the chain. The chain is also able, however, to bend in a direction at right-angles to that permitted by the slot 37 by rotation of the ball 24 and neck 23 about an axis perpendicular to the plane of the section 4—4 of the drawing. It will be seen from Figure 4 that the side walls 12, 13, are curved at their ends 38 concentrically with the centre of the ball 24, 26, so as to permit movement of the socket-wall 18 when the chain bends in this manner.

It is to be noted that the hemispherical recess 21 of the liner 20 fits the surface of the ball-member 24 up to a region closer to the neck 23 than the "equator" of the ball member (i. e. the diameter of the ball member taken at right-angles to the neck), so that it is not free to come out of the socket when the liner has been assembled in the link. In assembling, the liners are first placed over the ball members and then the liners are inserted in the bore 32 and the rivet 36 holds all together.

The walls 18, 19 of the socket are cylindrical or substantially cylindrical on their outer faces 39, 40, and thus, when the chain is assembled, as shown in Figure 1, the spaces 14 (between the walls 39, 40 and the side walls 12, 13) are of such a shape as to be capable of fitting the normal shape of sprocket teeth which are employed on coal cutters to drive the chain. Ordinary standard sprockets of coal cutters can be employed having teeth fitting between the socket members on alternate pairs of links, or if desired sprockets having teeth to fit between every pair of links can be used.

It will be seen that the above construction consists of very few parts, namely the link 11 (complete with its socket, pick-box, jibs, neck and ball all in one piece), the setscrew 31 for securing the pick, the liner 20, ball-cover 26 and the rivet 36 for retaining the liner in the socket.

I claim:

1. A coal cutter chain consisting of links wherein each link has a base portion adapted to run in a gib, a socket upstanding from the base portion at one end, a neck at the other end directed inwardly from a portion of the link and carrying a ball adapted to be received in the socket of the adjoining link of the chain, and a pick-box between the socket and the ball, each socket having a wall which extends between the ball member of the adjoining link and the body portion of the adjoining link.

2. A coal cutter chain as claimed in claim 1, wherein bores to receive the ball members and their necks extend inwardly in the socket portion of each link toward the base thereof and in the bores there are liners which contain a part-spherical recess which fits the corresponding ball member up to a region closer to the neck than the "equator" of the ball member, so as to retain the ball member therein, and wherein the liners are provided with securing means to hold them in the bores for the purpose described.

3. A coal cutter chain as claimed in claim 1, wherein the ball is formed with a renewable portion to take wear.

4. In a coal cutter chain the combination of a series of links each provided with a socket at one end and a neck carrying a ball at the other end, the said ball being adapted to be received in the socket of the adjoining link and the neck carrying the ball extending from the ball in a direction away from the base of the chain, tool carrying sockets on at least some of the links on the portion towards which the neck extends, guiding surfaces on the base and sides of every tool carrying link which serve to hold the link against reaction forces exerted upon the tool and walls to the sockets which extend between the ball member in the socket and the next link of the chain.

5. A coal cutter chain having in combination a series of links each provided with side walls, a socket at one end and a neck carrying a ball at the other end, tool-carrying bosses on at least some of the socketed links, the sockets being formed in one piece with the side walls and having substantially cylindrical exteriors with their axes at right angles to the side walls whereby the spaces between the sockets of adjoining links are adapted to fit the normal shape of sprocket teeth on coal cutters, and liners within the sockets to hold the balls of adjacent links in place within the sockets.

SIDNEY ERNEST PROCTOR.

REFERENCES CITED

The following references are of record in the file of this patent:

UNITED STATES PATENTS

| Number | Name | Date |
| --- | --- | --- |
| 363,216 | Dodge | May 17, 1887 |
| 443,769 | Hurford | Dec. 30, 1890 |
| 890,336 | Coates | June 9, 1908 |
| 1,336,927 | Silvius | Apr. 13, 1920 |
| 1,861,642 | Paulson | June 7, 1932 |
| 2,086,573 | Osgood | July 13, 1937 |